Feb. 10, 1925.
H. R. MASON
BRAKE GEAR FOR VEHICLES
Filed Dec. 29, 1920
1,526,003
5 Sheets-Sheet 1
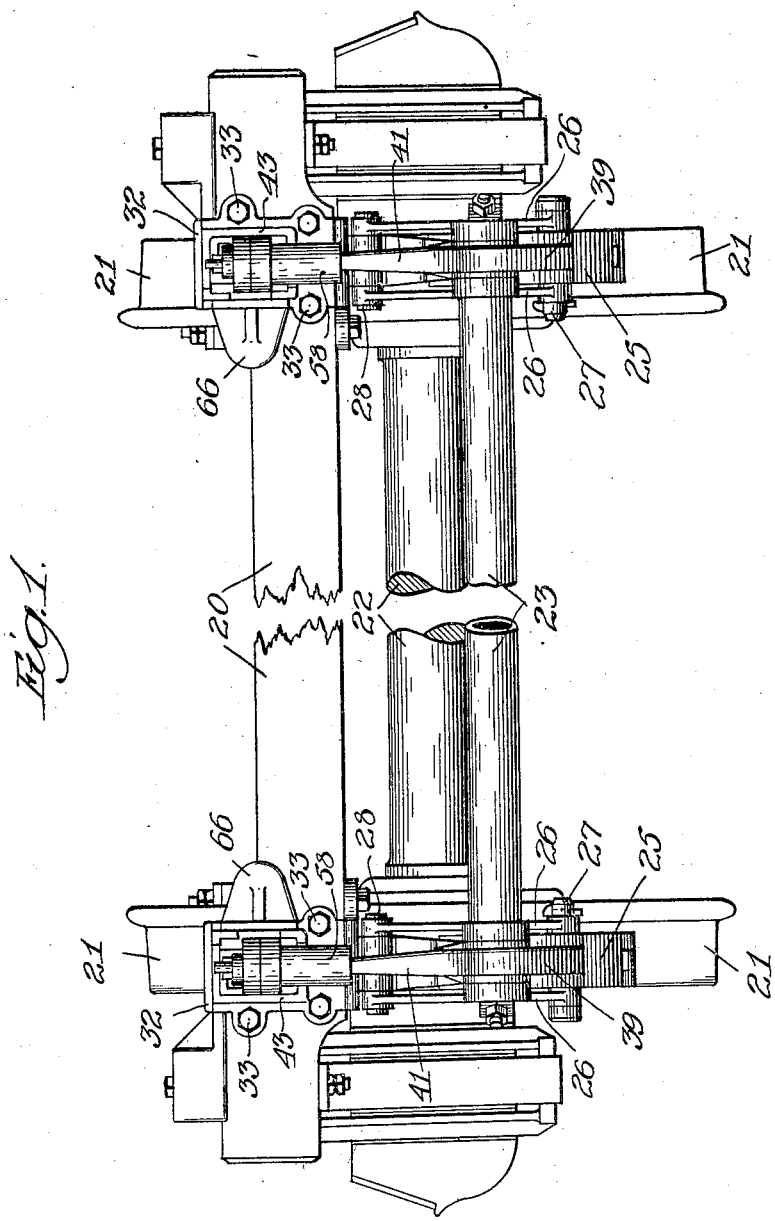
Inventor:
Harry R. Mason,
By Dyrenforth, Lee, Chritton & Wiles
Atty s Feb. 10. 1925.
H. R. MASON
BRAKE GEAR FOR VEHICLES
Filed Dec. 29, 1920   5 Sheets-Sheet 2
1,526,003
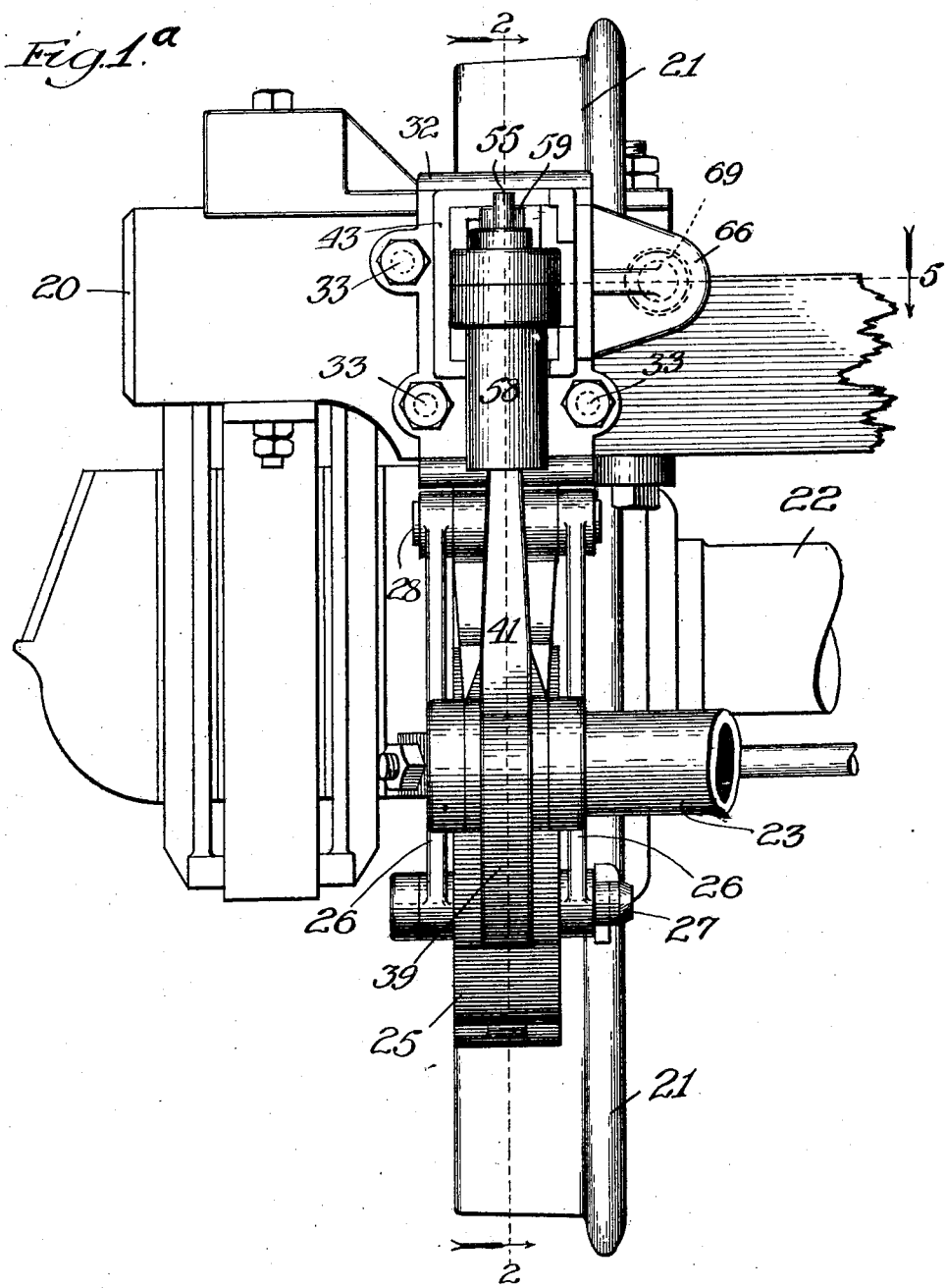

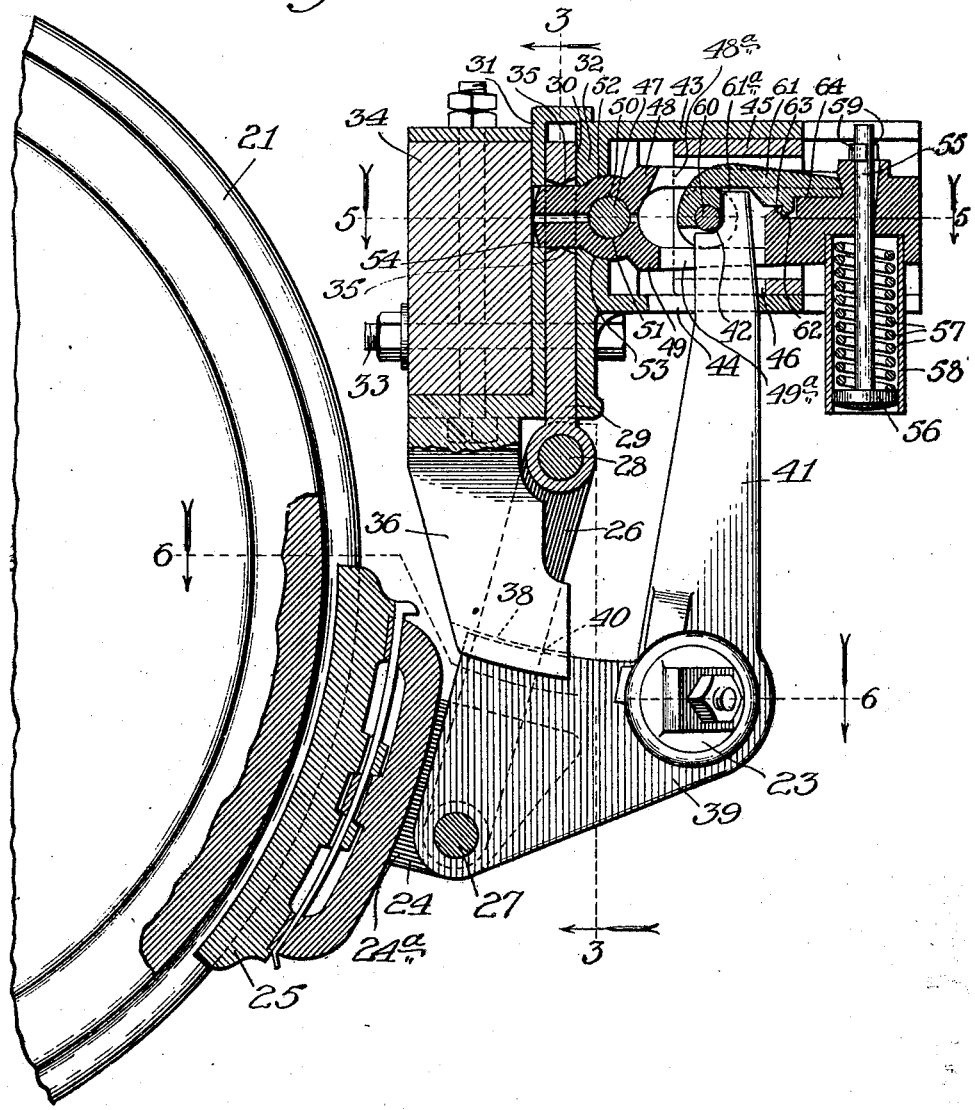

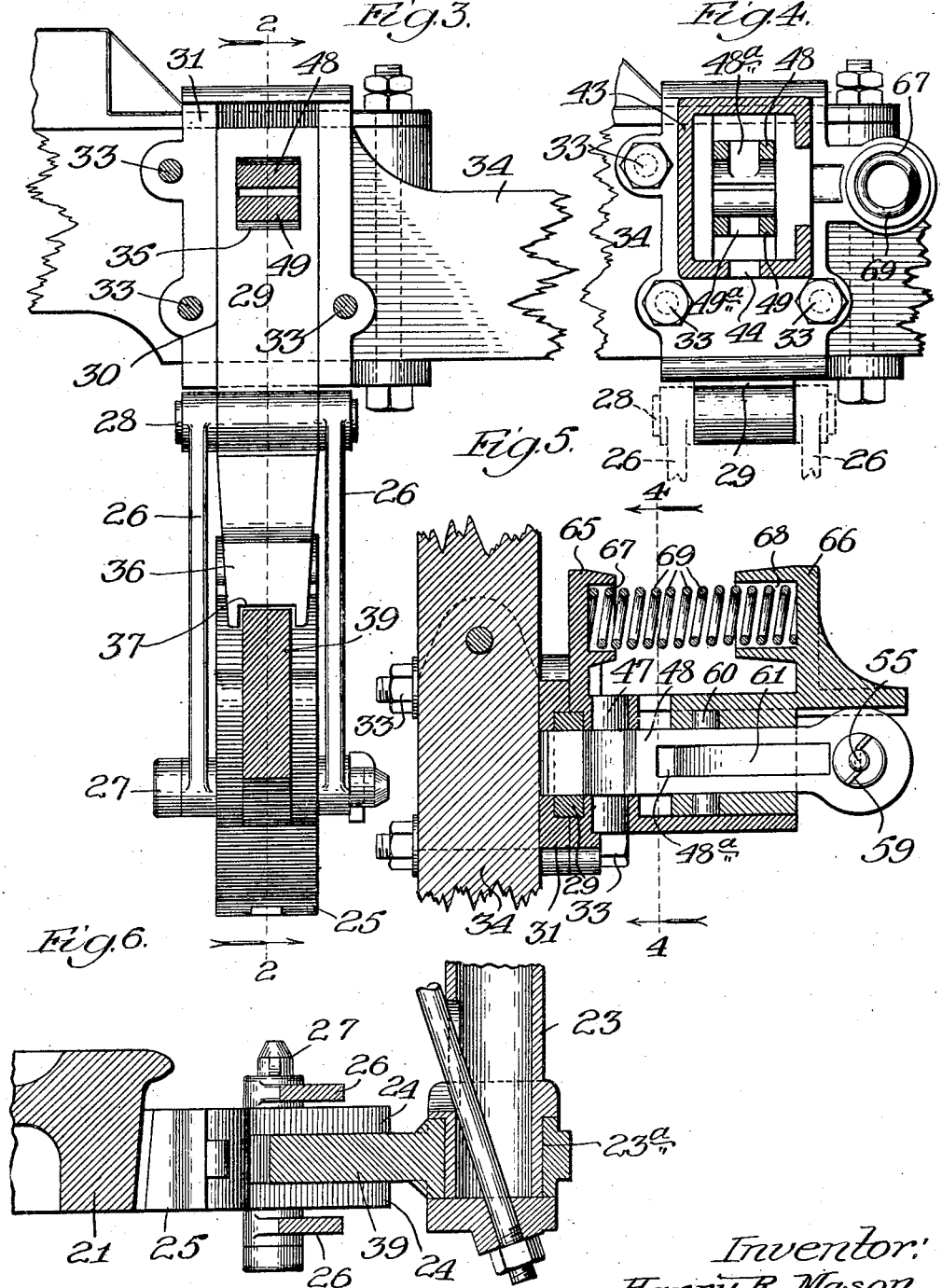

Feb. 10, 1925.   1,526,003
H. R. MASON
BRAKE GEAR FOR VEHICLES
Filed Dec. 29, 1920   5 Sheets-Sheet 5
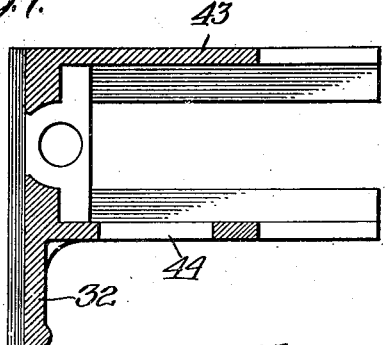
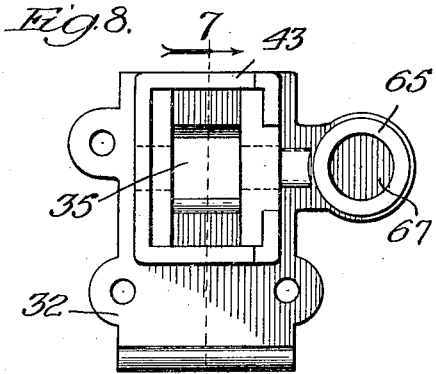
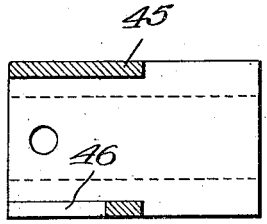
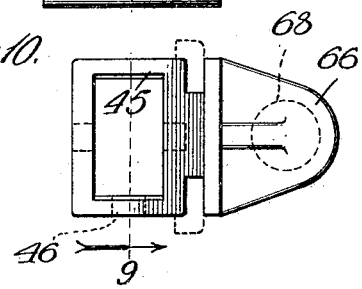
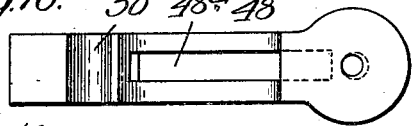
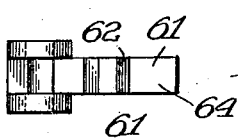
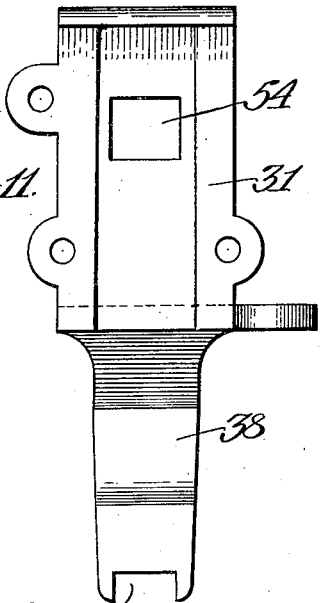
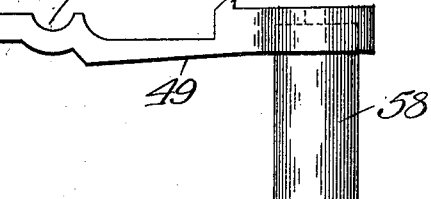
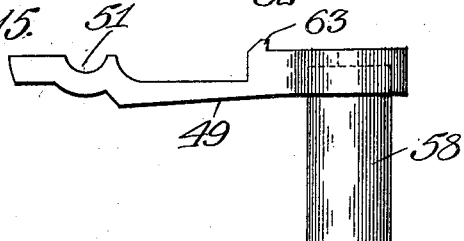
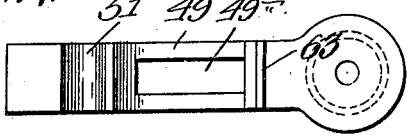

Patented Feb. 10, 1925.

1,526,003

UNITED STATES PATENT OFFICE.

HARRY R. MASON, OF CHICAGO, ILLINOIS.

BRAKE GEAR FOR VEHICLES.

Application filed December 29, 1920. Serial No. 433,766.

*To all whom it may concern:*

Be it known that I, HARRY R. MASON, a citizen of the United States, residing at Chicago, in the county of Cook and State of Illinois, have invented a new and useful Improvement in Brake Gears for Vehicles, of which the following is a specification.

My invention relates to mechanism co-operating with the brake-shoes for the wheels of vehicles, for effecting, in an automatic manner, such conditioning of the brake mechanism that skidding of the wheel or wheels of the vehicles and consequently so-called "flat-wheels" except as may result from an emergency brake application, is prevented.

It has been found by careful investigation of trains in action that the most common and objectionable occurrence of skidding or sliding of wheels is the skidding or sliding which occurs as to one, or a scattered few of the wheels (or sets of wheels if the wheels are provided in pairs rigid on the opposite ends of an axle) when the brakes are relatively lightly applied, and while the reason for the friction between the wheel and the brake becoming greater under relatively lightly applied braking pressure, than the adhesion between the wheel and track, thereby breaking the last-referred-to adhesion, is not definitely known, it is understood that in most, if not all, instances, this result is due to the heating, for one reason or another, of the brake-shoe by its frictional engagement with the wheel. It has also been found in practice that where in the running of a relatively long train the brakes are applied, under some conditions one or more of the intermediate cars ceases to move while its brakes are applied, and the other cars continue to move, and in the continuing of the running of the train such intermediate car or cars are again set in motion, that a wheel or wheels of such car, or cars, is held against rotation by the increase of the coefficient of friction between the brake shoe, or shoes, of such wheel, or wheels, thus causing skidding of the wheel or wheels.

My object, generally stated, is to provide against skidding of the wheel or wheels of vehicles, except as may result from an emergency brake application, without impairing the proper functioning of the brakes in their normal manner under the different degrees of application of braking pressure to the wheels, and the different track conditions, unless skidding of the wheel or wheels result except in emergency brake application.

A further object is to provide novel, simple and positively-operating mechanism for the purpose stated, which shall not be liable to become impaired for use.

As is well known, it is the practice in railroad construction to provide the supporting wheels of the vehicles in sets, two wheels in each set, the wheels forming each set thereof being rigidly connected together to cause the wheels of each set mounted on a common axle at opposite sides of the vehicle, to rotate together, there being provided for co-operation with each wheel, a separate brake-shoe. Where such is the case, the skidding referred to may be effected by the creation, primarily at one brake-shoe only, of a degree of friction between it and the wheel, co-operating therewith, sufficient to break the adhesion between both wheels and the rails, or the skidding may be produced by a condition occurring simultaneously at both brake-shoes resulting in the production of such a degree of friction between both brake-shoes and their co-operating wheels that the adhesion between the wheels and the rails is overcome. In this connection, it is a further object of my invention to provide a mechanism which will operate to effectually prevent the skidding referred to under either of the conditions just pointed out, regardless of most of the fluctuating track conditions, and without disturbing the normal functioning of the brakes under the application of different braking pressures, prior to the transpiring of conditions which, if allowed to continue, would produce such skidding and without disturbing the proper functioning of the brakes in emergency brake application.

Otherwise stated, my general object is to provide a structure wherein the brakes, unless conditions transpire which if continued would produce such skidding, excepting in the case of emergency brake application, are free to normally function, the purpose of the invention being to render the operation of the brakes unimpaired for their most effective work and only disturb their operation when such conditions transpire as would cause such skidding of the wheels, if continued, except in the case of emergency application.

Generally stated, my invention consists in so constructing the mechanism that the tangential force exerted by the brake-shoe, when the conditions are such that, if continued, skidding would occur, except under emergency brake application, is utilized to so affect the braking mechanism as to positively prevent the recurrence of a condition which, if continued, would produce skidding, by preference the mechanism operating to automatically effect the release of the pressure of such brake-shoe against the wheel with which it co-operates but without affecting any other of the brake-shoes of the vehicle.

Referring to the drawings:—

Figure 1 is a broken view in elevation of the opposite end portions of a truck of a railway car, showing the vehicle equipped with braking mechanism at opposite ends of the truck in accordance with my invention. Figure 1$^a$ is an enlarged, similar, view of one end of the truck with the brake mechanism thereon. Figure 2 is a view in elevation, partly sectional, of the construction shown in Fig. 1, the section being taken at the line 2—2 on Fig. 1 and viewed in the direction of the arrows. Figure 3 is a section taken at the line 3—3 on Fig. 2 and viewed in the direction of the arrows. Figure 4 is a section taken at the line 4—4 on Fig. 5 and viewed in the direction of the arrows. Figure 5 is a section taken at the lines 5—5 on Figs. 1 and 2 and viewed in the direction of the arrows. Figure 6 is a section taken at the irregular line 6—6 on Fig. 2 and viewed in the direction of the arrows. Figure 7 is a sectional view of one of the parts involved in the mechanism illustrated in the preceding figures, the section being taken at the line 7 on Fig. 8 and viewed in the direction of the arrow. Figure 8 is a view in end elevation of the part shown in Fig. 7. Figure 9 is a view in longitudinal section of a sliding member located within the member of Fig. 7, the section being taken at the line 9 on Fig. 10 and viewed in the direction of the arrow. Figure 10 is an end view of the member shown in Fig. 9. Figure 11 is a view in elevation of another portion of the mechanism of Figs. 1 to 6 inclusive. Figure 12 is a bottom view of a locking dog or pawl employed. Figure 13 is a view in side elevation of the pawl of Fig. 12. Figure 14 is a view in side elevation of one of the locking levers employed. Figure 15 is a similar view of the opposed locking lever employed. Figure 16 is a plan view of the lever shown in Fig. 14; and Figure 17, a plan view of the lever shown in Fig. 15.

A portion of the truck of a car is represented at 20, this truck being equipped with wheels represented at 21 and rigidly secured to the ends of an axle 22 journaled on the truck in accordance with common railway practice.

In the particular construction shown my invention is illustrated as applied to a car employing air-pressure-operated brake-beams in accordance with common practice, one of these beams being represented at 23 and in the operation of the air-pressure-operated mechanism of the car, to apply the brakes swinging toward the wheel 21 to the left in Fig. 2.

In the arrangement shown the brake-beam 23 is connected at its ends with brake-heads, represented at 24 and each carrying a brake-shoe 25 for co-operation with the adjacent wheel 21. In accordance with the preferred embodiment of my invention each brake-head 24 is pivotally connected by the pin 27 with the lower ends of a pair of rods 26 spaced apart and between which it extends, these rods being pivotally connected at their upper ends, through the medium of a pin 28, with a longitudinally reciprocable, upright, bar 29 guidingly confined in a channel 30 provided between flatwise opposed members 31 and 32, the members 31 and 32 being rigidly secured in position by means of bolts 33 passing through these members and the cross-bar 34 of the truck 20. The bar 29 contains an opening 35 into which ends of levers hereinafter described extend and with which they co-operate at the upper and lower surfaces of the opening 35, these surfaces preferably flaring in opposite directions as indicated in Fig. 2. The member 31 is provided with a depending portion 36, the lower surface of which is channeled as represented at 37, with the base of the channel curved as represented at 38 for co-operation with a lever hereinafter referred to and connected with the brake-head as hereinafter described.

The connection of the brake-beam 23 with each brake-head 24 is through the medium of a bell-crank lever 39, this lever being pivotally supported on the brake-beam at an opening 23$^a$ in its angle-portion, but with a loose fit to permit the brake beam to move at the end thereof connected with the brake head, slightly in a substantially horizontal plane relative to the brake head, in the functioning of the mechanism to prevent skidding as hereinafter explained, without affecting the brake-head at the other end of the brake-beam. The forwardly-projecting leg of the lever 39 extends into the bifurcated portion 24$^a$ of the brake-head 24 and pivotally engages the pivot 27, the upper surface of this leg being preferably curved as represented at 40 and at which portion it extends into the channel 37, but normally out of contact with the curved surface 38 of the latter. The other leg of the bell-crank and represented at 41, is recessed as represented at 42 for engagement with a stop device hereinafter referred to. The member 32 is provided with a lateral extension 43, in the form of a housing, through a longitudinally-extending slot 44 in the bottom of which the leg 41 of the bell-crank 39 extends and is adapted to be movable, the extension 43 containing a hollow slide-member 45 guidingly confined in the extension 43 to be slidable therein lengthwise of the latter, the slide-member 45 containing an aperture 46 in its underside through which the leg 41 upwardly extends. The extension 43 carries a shaft 47 extending crosswise thereof at a point adjacent the bar 29, and located above and below this shaft are two levers 48 and 49, respectively. These levers are recessed as indicated at 50 and 51, respectively, at which portions they partially surround the shaft 47 at the upper and lower sides of the latter, and at their upper and lower adjacent surfaces are curved, as represented at 52 and 53, at which portions they oppose similarly upper and lower curved surfaces on the member 32, the shaft 47 forming a fulcrum for these levers. The adjacent ends of these levers extend through the opening 35 in the bar 29 and into an opening 54 in the member 31, these levers being so proportioned, as shown, that when in the position shown in Fig. 2, they will be spaced apart at the ends thereof at which they extend into the opening 35, a sufficient distance to permit either one of these levers to be rocked in a vertical plane under the action of the bar 29 as and for a purpose hereinafter described. The other ends of the levers 48 and 49 extend lengthwise through the extension 43 and the slide-member 45, the lever 49 being slotted at 49a to receive the lever 41, there being provided for co-operation with these levers, tending to maintain them in the position shown in Fig. 2, spring means which in the construction illustrated involve a rod 55 extending through the outer ends of the levers 48 and 49, the rod 55 being provided with a head 56 between which and the under side of the lever 49 a coiled spring 57 surrounding the rod 55, is confined, the lever 49 being shown as provided with a housing 58 depending therefrom and in which the spring referred to is located, the rod 55 where it projects upwardly through the lever 48 being provided with a stop-pin 59 for holding the spring 57 under tension, it being noted that the spring means shown operate to resist the rocking of the lever 48 in anti-clockwise direction in Fig. 2 and the lever 49 in clockwise direction therein.

The slide 45 is provided with a cross-pin 60, forming the stop-pin hereinbefore referred to, provided for engagement with the leg 41 of the bell-crank 39 and operating as hereinafter described; and pivotally-supported on the pin 60, and extending into a recess 48a in the lever 48, is a dog, or pawl, 61 recessed, as indicated at 61a, to permit the lever 41 to interlock with the pin 60 as shown. The pawl 61 is provided with a depending tooth, or lug, 62 adapted in the normal position of the parts shown in Fig. 2 to interlock with a projection, or tooth, 63 extending upwardly from the lever 49, the outer end of the pawl 61 extending at its under side 64 into overlapping engagement with the lever 48, and being capable of moving lengthwise with the slide-member 45, along the lever 48.

The member 32 and slide-member 45 are provided with laterally-extending lugs 65 and 66 affording sockets 67 and 68, respectively, which open toward each other and in which the ends of a coiled spring 69 interposed between these lugs, extend, this spring which is preferably under tension at all times and which is provided for returning the slide-member 45 to normal position (Fig. 2) when the latter is actuated as hereinafter described, preferably is of such light construction as merely to move the part 45 to normal position and not present appreciable friction to the movement of the slide-member 45 when the latter is actuated to the left in Fig. 2.

A general description of the operation of the mechanism is as follows: Assuming the brake mechanism to be in the position shown in the drawings; when the air-brake mechanism of the car is operated the brake-beam 23 swings to the left in Fig. 2 and through the medium of its connection with the brake-heads 24, at the pivots 27, moves the brake-shoes 25 into frictional engagement with the wheels 21. In the said movement of the parts the levers 41 swing and slide, upon the pins 60, the members 45 being held against sliding to the left in Fig. 2 by the interlocking engagement of the pawls 61 at their teeth 62, with the teeth 63 of the levers 49, these parts being held in such interlocked relation by virtue of the frictional engagement between the teeth 62 and 63 augmented by the springs 57 which operate to yieldingly hold the levers 48 and 49 against separation. In the application of the brakes as stated, the links 26 swing on the bars 29 at the pivots 28, the parts being so proportioned and arranged that the levers 39 in the swinging movement described remain at their surfaces 40 out of engagement with the surfaces 38 of the brackets 36. The brake-shoes 25 in bearing against the turning wheels 21 are caused to exert an upward or a downward thrust on the bars 29, depending on whether the wheels are rotating in anti-clockwise direction or in clockwise direction, in Fig. 2. So long as this upward or downward thrust is not sufficient to overcome the resistance to separation of the teeth 62 and 63, exerted by reason of the interlocking of the teeth with each other and the resistance of the springs 57, the resistance to separation of the teeth being dependent also on the pressure applied to the levers 39 by the brake-beam 23, the bars 29 remain in normal position with the surfaces 38 and 40 out of engagement with each other, but as soon as this upward or downward thrust, as the case may be, at any one of the bars 29, exceeds that of the resistance presented to the separation of the teeth 62 and 63, such bar 29 shifts releasing the member 45 and pawl 61 for movement to the left in Fig. 2 under the action of the bell-crank 39 which is forced to the left in this figure by the action of the brake-beam 23 and turns on the pivot 27, the result of such operation of the parts being to cause the lever 39 to engage with the lower channeled end of the member 36, thereby reducing the leverage exerted by the brake-beam against the brake-head 24 and commensurately relieving the pressure exerted by the shoe against the wheel.

It will be noted from the foregoing that the particular illustrated embodiment of my invention operates upon the principle of automatically reducing the power exerted by the brake-beam upon the brake-shoe by force exerted by the shoe in an upward or downward direction, depending upon the direction in which the wheel is rotating.

It will be understood from the foregoing that in the arrangement shown one of the mechanisms described and illustrated is associated with each brake-shoe, and as the automatic relieving of the braking-pressure against any one wheel, as hereinbefore described, is accomplished without reducing the air-pressure applied to the beam 23, the relieving of the pressure exerted by the brake-shoe of any one wheel, by the existence of such conditions as will cause the bar 29 cooperating therewith to shift and disengage the teeth 62 and 63, will not affect the normal operation of any of the brakes co-operating with the other wheels; not even the brake-shoe at the other end of the brake-beam where the brake-beam is equipped with two brake-devices, as described, by reason of the connections between the brake-beam and the shoes at 23 as hereinbefore explained, which are similar to swivels having their axes in a substantially vertical plane. The functioning of the mechanism as stated is of great advantage inasmuch as conditions may arise as to the brake-mechanism for one of the wheels which would cause the brake-mechanism for this wheel to release before the brakes of the other wheels have even approximated a maximum braking effect.

My invention aims, more particularly, at the prevention of skidding or sliding of the wheels under relatively low applied brake pressures, the invention operating on the principle of presenting, to the movement of the parts which, in being operated, cause the braking force against the wheel to become automatically reduced, a resistance which increases as the amount of applied braking pressure increases, in the particular construction illustrated, and by way of example only, this variable resistance being exerted to yieldingly resist the separation of the teeth 62 and 63, the varying resistance thus caused to be exerted being such, at any given degree of applied braking pressure, that it will require a greater force, exerted through the bar 29, to overcome this resistance, than the force exerted through the bar 29 by the tangential action of the brake-shoe at the time of stopping of the wheel from any speed, when the wheel does not skid, under ordinary track conditions, but a less force than would be exerted against this bar tending to move it lengthwise, in the event of the skidding of the wheel under relatively light brake applications. Thus while the mechanism is affected, under all applications of braking pressure (except where the brakes are applied in excess of the track adhesion), to such degrees that should rotation of a wheel become arrested during the movement of the vehicle flat wheels would result to prevent the existence of friction between the brake-shoe and the wheel to a degree sufficient to produce skidding of the wheel, it will permit of the normal operation of the brakes, viz, without skidding the wheels, under all conditions and in the case of emergency applications will not interfere with the operation of the brakes even should skidding occur, it being noted that the tangential force necessary to be exerted by the brake on the bar 29 to disengage the teeth 62 and 63 is, for any given applied brake pressure, greater than the tangential force exerted on this bar by the brake in the stopping of the wheel without skidding of the latter.

In the arrangement illustrated the resistance to the disengaging of the teeth 62 and 63 is afforded by the provision of the interengaging portions of these teeth at an angle to the longitudinal plane of the levers 48 and 49 when in normal position (Fig. 2), the resistance thus afforded and which depends on the degree of said angle, being augmented by the resistance afforded by the spring 57.

As an example of the embodiment of my invention in actual practice, the following is presented:

Assume that the weight of the car equipped with the brakes is about 62,000 pounds, the weight of each wheel on the rail being about 7,750 pounds and the braking pressure about 90%; that the fulcrums for the levers 48 and 49 are so arranged, as shown, that the force required to be applied to the bar 29, for moving the latter lengthwise, to disengage the teeth 62 and 63 from each other, is equal to about 350% of the force required to be directed against the bar to actuate it as stated, were the fulcrums of the levers located midway between the engaging faces of the teeth 62 and 63 and the points of engagement of these levers with the bar 29; that the brake-beam pressures are about 1,120 pounds at one-eighth brake application; about 2,989 pounds at one-third brake application; about 4,483 pounds at one-half brake application; about 5,978 pounds at two-thirds brake application and about 8,967 at full brake application; the spring 57 would be provided of a tension requiring the exertion of about 136 pounds to compress it to a point where the teeth 62 and 63 would disengage, and the angle at which the opposing faces of the teeth 62 and 63 would extend would be about 5°. Under the conditions above stated the pressure exerted by the brake-shoe on the bar 29 tending to move it lengthwise, at the moment the wheel stops rotating without skidding or sliding, is about 242 pounds at one-eighth brake application, about 646 pounds at one-third brake application, about 969 pounds at one-half brake application, about 1,292 at two-thirds brake application, and about 1,939 at full brake application, when the rail is dry and the coefficient of friction is .277; and the pressure exerted by the brake-shoe on the bar 29 tending to move it lengthwise, at the moment the wheel stops rotating without skidding or sliding is, for the various brake applications mentioned above about 393, 1,049, 1,575, 2,099 and 3,150 pounds, respectively, when the rail is dry and sanded, the coefficient of friction being .45; on the other hand the tangential force exerted on the bar 29 when one of the brake-shoes of the set causes skidding or sliding of the wheel when the vehicle is running at fifteen miles an hour and the rail is dry (with a coefficient of friction of .213) is, for the various brake applications mentioned, about 4,076, 3,766, 3,517, 3,269 and 2,771 pounds, respectively; when both brake-shoes cause skidding at any speed of the car, the tangential brake friction exerted against the bar 29, when the rail is dry, is about 2,131 pounds, and when the rail is dry and sanded about 3,150 pounds, for all brake applications. Furthermore, under the above conditions the amount of pressure required to be exerted by the bar 29 against one or the other of the levers 48 and 49, for disengaging the teeth 62 and 63, at the above stated braking pressures, would be about 1,208, 1,708, 2,104, 2,504 and 3,300 pounds, respectively.

In the above example it will be noted that as the operator increases the braking pressure which he applies against the brake-heads through the brake-beam operating them, the resistance to the disengagement of the teeth 62 and 63 from each other increases, for the various applied braking pressures specified above, the said resistance throughout the entire range of applied braking pressures requiring a greater force for overcoming it, for any applied braking pressure, than the tangential force generated by the brake-shoe and exerted against the bar 29 in the stopping of the wheels without skidding or sliding; a greater force for overcoming it than that produced by skidding in emergency brake applications, and a less force for overcoming it than that produced in the event of skidding under lighter brake applications. Furthermore the starting of the rotation of a wheel with the brakes set at any applied braking pressure, will not exert a tangential force sufficient to disengage the teeth 62 and 63.

The above example is presented by way of illustration only, and it is to be understood that the above mentioned figures are not absolute, but it is believed that in practice the figures will be about those given. However, these figures may very greatly vary without affecting the principle of operation of the invention and its applications to use, inasmuch as the difference between the various pressures exerted tangentially by the brake-shoes under varying conditions in the stopping of the rotation of the wheels without skidding, and the tangential pressures produced by the brake-shoes when the wheels skid, especially upon one-half and less applied brake pressures, is sufficiently great to provide such margins as to insure the proper operation of the device.

Furthermore, applicant does not wish to be understood as intending to limit his invention in any way by the presentation of the example above set forth.

The parts of the mechanism described are preferably so proportioned and arranged that when the pressure exerted against one or the other of the levers 48 and 49 by means of the actuation of the bar 29 as stated, is sufficient to disengage the shoulders 62 and 63, thereby permitting the member 45 and pawl 61 to move to the left in Fig. 2 which allows the lever 41 to shift to the left in this figure, its arm 39 abutting the member 36 at the lower corner thereof, the pressure exerted by the brake-beam 23 against the brake-head 24, becomes reduced to such a degree, without affecting the pressure exerted against the brake-beam for operating the latter, that it is impossible for a condition to arise which would result in skidding the wheels of this particular set from this particular brake-shoe.

Inasmuch as the reduction of pressure between the brake-shoe, the pressure of which is released as stated, and the one of the two wheels of a set thereof with which it cooperates, assuming both wheels to be rigidly connected together, is affected by a change of conditions beyond the brake-beam and the operating mechanism therefor, the automatic relieving of the brake against such wheel, is accomplished without reducing the applied air pressure, so that the reduction of the braking pressure of such brake-shoe against the wheel with which it co-operates, under the conditions above stated, does not affect the normal operation of any of the other brakes, which is of great advantage inasmuch as conditions might arise as to the brake mechanism for one wheel which would cause the brake mechanism for this particular wheel to become reduced before the brakes of the other wheels have even approximated maximum braking effect.

Assuming that the mechanism is operated into a position in which the teeth 62 and 63 have disengaged, in which operation the pressure of the brake-shoe against its co-operating wheel has been automatically reduced, as stated, and the pressure of the brake-shoe against the wheel ceases, the releasing of the brake will allow the slide member 45 and pawl 61 to be returned to normal position represented in Fig. 2, by the action of the spring 69, the pawl in moving to such position rotating at its tooth 62, over the tooth 63 (the pivoting of the pawl 61 at 60 permitting of the rocking of the pawl) to a position in which the tooth 62 drops behind the tooth 63 to reposition the pawl to the next operation of applying the brakes.

While the spring 57 is recited as provided of such tension as to augment the resistance afforded by the inter-engaging teeth 62 and 63 to the release of the pin 60 and in the example cited substantially augments the action of these teeth, it will be understood that, if desired, the spring may be provided, and substantially correspondingly tensioned, merely for the purpose of holding the levers 48 and 49 in such position that the teeth 62 and 63 are held in overlapped relation against the tendency of these levers to assume a position in which the teeth are separated when no braking pressure is being applied, and thus render these levers in such position that when the braking pressure is applied the teeth shall be so disposed that they will act as stated, under which conditions the teeth would be slightly more inclined to effect the desired resistance to separation of the levers 48 and 49.

It will be noted from the foregoing description and drawings that the mechanism will operate in the manner described regardless of the wearing down of the braking face of the brake-shoe.

While I have illustrated and described a particular construction embodying my invention, I do not wish to be understood as intending to limit it thereto, as the same may be variously modified and altered without departing from the spirit of my invention.

What I claim as new, and desire to secure by Letters Patent, is:

1. The combination with a vehicle, of braking mechanism for the wheels of the vehicle, and means associated with said braking mechanism and operating by tangential force exerted by the brakes to effect a reduction of the pressure exerted by the brakes involving mechanism normally restrained against movement, and means whereby the degree of restraint upon said last-referred-to mechanism is caused to be greater for higher degrees of applied braking pressures.

2. The combination with a vehicle, of braking devices for the wheels of the vehicle, means for operating said devices from a common source, and a plurality of individually operative means associated with said braking devices, respectively, and operating by tangential force exerted by the braking devices, to effect a reduction of the pressure exerted by a brake for one wheel without affecting the braking pressure exerted by the braking devices cooperating with the others of said wheels, said last-named means involving mechanism normally restrained against movement, and means whereby the degree of restraint upon said last-referred-to mechanism is caused to be greater for higher degrees of applied braking pressure.

3. The combination with a vehicle, supported on wheels provided in sets, the wheels of each set being connected for rotation as a unit, of braking mechanisms for the wheels of the vehicle, and a plurality of means associated with said braking mechanisms for the several wheels, respectively, and each operating by tangential force exerted by the respective brakes, to effect a reduction of the pressure exerted by the brake involving mechanism normally restrained against movement, and means whereby the degree of restraint upon said last-referred-to mechanism is caused to be greater for higher degrees of applied braking pressure.

4. The combination with a vehicle, of braking mechanism for the wheel of a vehicle, and means associated with said braking mechanism operating by tangential force exerted by the brake to effect a reduction of the pressure exerted by the brake, involving a shiftable member the position of which controls the amount of braking pressure, for any given application of applied braking pressure, of the brake against the wheel, means normally restraining said shiftable member against movement to a position in which the braking pressure of the brake against the wheel is reduced, and means whereby the degree of restraint upon said shiftable member is caused automatically to become of greater degree for higher degrees of applied braking pressure.

5. The combination with a vehicle, of a braking device for a wheel of the vehicle, means for actuating said device to brake the wheel, and means associated with said braking mechanism operating by tangential force exerted by the brake device, to effect a reduction of the pressure exerted by the brake device, said last-named means including a shiftable member with which said first-named means and said braking device are connected and through the medium of which said braking device is operated, fulcrums spaced apart and co-operating with said shiftable member and between which and said braking device said first-named means are connected, said shiftable member being normally restrained against movement, and means whereby the degree of restraint upon said shiftable member is caused to automatically increase when applied braking pressures are increased.

6. The combination with a vehicle, of a braking device for a wheel of the vehicle, lever mechanism operatively connected with said braking device, means for actuating said lever mechanism, restraining means co-acting with said lever for restraining movement of the latter and automatically operating to increase the restraint when the applied braking pressures are increased, and means operating automatically when said lever in its movement overcomes said restraining means, to reduce the leverage exerted against said braking device through said lever mechanism.

7. The combination with a vehicle, of a braking device for a wheel of the vehicle, a shiftable device, means operating through the medium of said shiftable device to actuate said braking device, means normally restraining movement of said shiftable device and presenting increased resistance when higher braking pressures are applied, means, controlled by said braking device, for actuating said last-named means to permit said shiftable device to move, when the force exerted by said braking device in a direction tangentially of the wheel exceeds an amount sufficient for operating said second-named means, and means co-operating with said shiftable device for changing the leverage exerted against said braking device by said first-named means upon said movement of said shiftable device.

8. The combination with a vehicle, of a braking device for a wheel of the vehicle, a lever supported to be bodily shifted and operatively engaging said braking device, means for actuating said braking device engaging said lever between the point at which the latter engages said lever and the opposite end of said lever, means normally restraining bodily movement of said lever in the direction of its movement to apply braking pressure to the braking device, and operating automatically to present a greater degree of resistance as higher brake pressure is applied through said braking device, and a member positioned to engage said lever between the point at which it engages said restraining means and the point at which power is applied to said lever by said first-named means, upon the bodily movement of said lever upon overcoming said restraining means.

9. The combination with a vehicle, of braking mechanism for a wheel of the vehicle and means associated with said braking mechanism and operating to effect a reduction of the pressure exerted by the brake involving mechanism normally restrained against movement, and means whereby the degree of restraint upon said last-referred-to mechanism is caused to be greater for higher degrees of applied braking pressure.

10. The combination with a vehicle, of a braking device for a wheel of the vehicle, a lever supported to be bodily shifted and operatively engaging said braking device, means actuated by tangential force exerted by said braking device for actuating said braking device engaging said lever between the point at which the latter engages said lever, and the opposite end of said lever, means normally restraining bodily movement of said lever in the direction of its movement to apply braking pressure to the braking device, and operating automatically to present a greater degree of resistance as higher braking pressure is applied through said braking device, and a member positioned to engage said lever between the point at which it engages said restraining means and the point at which power is applied to said lever by said first-named means, upon the bodily movement of said lever upon overcoming said restraining means.

11. The combination with a vehicle, of braking mechanism for a wheel of the vehicle, and means associated with said braking mechanism and operating by tangential force exerted by the brake in the rotation of the wheel in either direction, to effect a reduction of the pressure exerted by the brake involving mechanism normally restrained against movement, and means whereby the degree of restraint upon said last-referred-to mechanism is caused to be greater for higher degrees of applied braking pressure.

12. The combination with a vehicle, of braking mechanism for the wheels of the vehicle, and means associated with said braking mechanism operating automatically to reduce pressure against any one of the wheels in their rotation in either direction without affecting the braking pressure against the others of the wheels, involving mechanism normally restrained against movement, and means whereby the degree of restraint upon said last-referred-to mechanism is caused to be greater for higher degrees of applied braking pressure.

13. The combination with a vehicle, of sets of braking devices for the respective sets of wheels of the vehicle, means for actuating said devices from a common source, and means operating automatically to reduce the power exerted by said means against said braking devices, without reducing the power exerted against said first-named means from said source, in the rotation of the wheels in either direction, involving mechanism normally restrained against movement, and means whereby the degree of restraint upon said last-referred-to mechanism is caused to automatically become greater for higher degrees of applied braking pressure.

14. The combination with a vehicle, of sets of braking devices for the respective sets of wheels of the vehicle, means for actuating said devices from a common source, and means operated by tangential force exerted by the braking devices operating automatically to reduce the power exerted by said means against said braking devices without reducing the power exerted against said first-named means from said source, in the rotation of the wheels in either direction.

15. The combination with a vehicle, of a braking device for a wheel of the vehicle, means for actuating said device to brake the wheel, and means operating automatically, in the rotation of the wheel in either direction, to reduce the power exerted by said means against said braking device, said last-named means including a shiftable member with which said first-named means and said braking device are connected and through the medium of which said braking device is operated, fulcrums spaced apart and co-operating with said shiftable member and between which and said braking device said first-named means are connected, and means normally restraining said shiftable member and operating automatically to present a greater degree of resistance for increased applied braking pressures.

16. The combination with a vehicle, of a braking device for a wheel of the vehicle, a shiftable device, means operating through the medium of said shiftable device to actuate said braking device, means normally restraining movement of said shiftable device, and operating automatically to present increased resistance for higher applied brake pressures, means controlled by said braking device and operating in the rotation of the wheel in either direction to actuate said last-named means to permit said shiftable device to move, and means co-operating with said shiftable device for changing the leverage exerted against said braking device by said first-named means, upon said movement of said shiftable device.

17. The combination with a vehicle, of braking mechanism for a wheel of the vehicle, and means for automatically reducing the pressure exerted by the brake involving a rock member, means through the medium of which tangential force exerted by said braking device rocks said member, means normally maintained, in the normal position of said member, in a position to permit said braking mechanism to operate normally, means whereby when said member is rocked as stated and said last-named means are released for movement, the pressure of said braking device against the wheel is reduced, and means presenting an overcomable resistance to the rocking of said member, operating automatically to provide increased resistance for increased applied braking pressures.

18. In a mechanism of the character set forth, the combination of a slide member, a second member engaging said slide member and tending to move it in one direction, a rock lever, a pawl carried by said rock lever, a surface adapted to be engaged by the projection on said pawl, said pawl and surface operating to prevent the sliding of said slide member under the action of said second member, said pawl being disengageable from said surface upon the rocking of said lever, and means for rocking said lever.

19. In a mechanism of the character set forth, the combination of a slide member, a second member engaging said slide member and tending to move it in one direction, a rock lever, a pawl carried by said rock lever, a surface adapted to be engaged by the projection on said pawl, said pawl and surface operating to prevent the sliding of said slide member under the action of said second member, said pawl being disengageable from said surface upon the rocking of said lever, spring means resisting the rocking movement of said lever, and means for rocking said lever against the tension of said spring means.

20. In a mechanism of the character set forth, the combination of a slide member, a second member engaging said slide member and tending to move it in one direction, a pair of rock levers adapted to be respectively rocked by force applied thereto in opposite directions, means for rocking said levers, one of said levers being provided with a projection, a pawl on said slide member, the projection on said pawl co-operating with the said projection on one of the levers for preventing the sliding of said slide member under the force exerted by said second member, and means whereby when the one of said levers other than that provided with said projection, is rocked, said pawl will be rocked with it to a position in which it disengages from said projection whereupon said pawl is free to shift with said guide member under the action of said second member, said pawl being free to shift relative to said last-referred-to lever, when said lever carrying said projection is moved to a position in which said projection is disengaged from said pawl.

21. In a mechanism of the character set forth, the combination of a slide member, a second member engaging said slide member and tending to move it in one direction, a pair of rock levers adapted to be respectively rocked by force applied thereto in opposite directions, means for rocking said levers, one of said levers being provided with a projection, a pawl on said slide member, the projection on said pawl co-operating with the said projection on one of the levers for preventing the sliding of said slide member under the force exerted by said second member, means whereby when the one of said levers other than that provided with said projection, is rocked, said pawl will be rocked with it to a position in which it disengages from said projection whereupon said pawl is free to shift with said guide member under the action of said second member, said pawl being free to shift relative to said last-referred-to lever, when said lever carrying said projection is moved to a position in which said projection is disengaged from said pawl, and spring means yieldingly resisting the movement of either of said levers to a position in which said pawl disengages from said projection.

22. The combination with a vehicle provided with a set of wheels rigidly secured to the ends of an axle, of braking mechanism for the said wheels comprising a brake-beam and brake-shoes connected therewith, said brake-shoes having flexible connection with the ends of said brake-beam, and means connected with said brake-shoes and operating by tangential force exerted by the brakes to effect a reduction of the pressure exerted by the brakes involving mechanism normally restrained against movement, and means whereby the degree of restraint upon said last-referred-to mechanism is caused to be greater for higher degrees of applied braking pressures.

HARRY R. MASON.